(12) United States Patent
Mozolowski

(10) Patent No.: US 7,127,148 B2
(45) Date of Patent: Oct. 24, 2006

(54) OPTICAL FIBRE MANIFOLD

(75) Inventor: Marek H. Mozolowski, Kinross (GB)

(73) Assignee: M.M. Telecables Limited, Scotland (GB)

( * ) Notice: Subject to any disclaimer, the term of this patent is extended or adjusted under 35 U.S.C. 154(b) by 0 days.

(21) Appl. No.: 10/479,660

(22) PCT Filed: Jun. 7, 2002

(86) PCT No.: PCT/GB02/02620

§ 371 (c)(1),
(2), (4) Date: Dec. 3, 2003

(87) PCT Pub. No.: WO02/099492

PCT Pub. Date: Dec. 12, 2002

(65) Prior Publication Data

US 2004/0141707 A1    Jul. 22, 2004

(30) Foreign Application Priority Data

Jun. 7, 2001    (GB) .............................. 0113880.9

(51) Int. Cl.
*G02B 6/00*    (2006.01)

(52) U.S. Cl. .................................... 385/137

(58) Field of Classification Search ........ 385/114–120, 385/134–137
See application file for complete search history.

(56) References Cited

U.S. PATENT DOCUMENTS

| | | | |
|---|---|---|---|
| 5,317,389 A | 5/1994 | Hochberg et al. ........... 356/382 |
| 5,402,512 A | 3/1995 | Jennings et al. .............. 385/46 |
| 5,471,555 A | 11/1995 | Braga et al. ................ 385/136 |
| 5,519,804 A | 5/1996 | Burek et al. ................ 385/135 |
| 5,659,655 A | 8/1997 | Pilatos ....................... 385/136 |
| 6,389,214 B1 * | 5/2002 | Smith et al. ................ 385/136 |

FOREIGN PATENT DOCUMENTS

| | | | |
|---|---|---|---|
| JP | 9-197145 | * | 7/1997 |
| JP | 10170735 | | 6/1998 |

OTHER PUBLICATIONS

International Search Report for PCT/GB02/02620, Copy enclosed.
British Patent Office Search Report, GB 0213025.0 (2 pages).

* cited by examiner

Primary Examiner—Javaid H. Nasri
(74) Attorney, Agent, or Firm—Watts Hoffmann Co., LPA

(57) ABSTRACT

An optical fiber manifold arrange to orientate a plurality of optical fibers from a single dimensional ribbon array to a two dimensional block array, wherein the fiber spacing (X) in the block array is the same as the fiber spacing in the ribbon array.

22 Claims, 7 Drawing Sheets

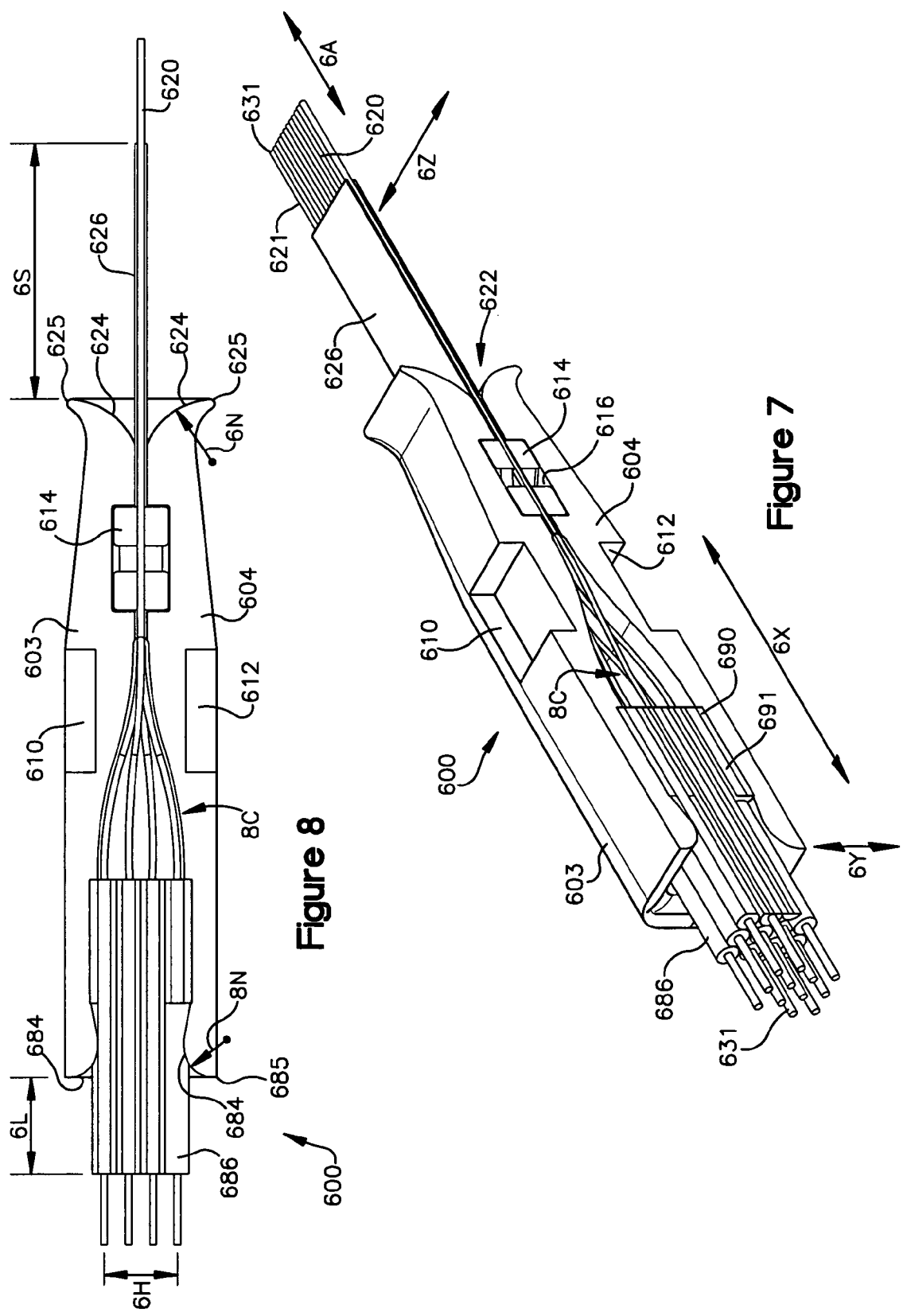

OPTICAL FIBRE MANIFOLD

FIELD OF THE INVENTION

The present invention relates to optical fibres support and retaining devices, and in particular, manifolds for optical fibres.

SUMMARY OF THE INVENTION

According to the present invention, there is provided an optical fibre manifold arranged to spread optical fibres from a single dimensional ribbon array to a two dimensional block array, wherein the fibre spacing in the block array is the same as the fibre spacing in the ribbon array.

It is known to provide an optical fibre manifold arranged to spread optical fibres from a single dimensional ribbon array to a two-dimensional block array, such as is shown in JP-A-10,170,735 (Nippon Telegraph & Telephone Corporation). However, a problem exists in manifolds where individual optical fibres change direction rapidly and this is known as "microbending". In the Nippon Telegraph document, the optical fibres change direction quite sharply so that there is a change in direction in two dimensions, that is, at right angles to the ribbon plane and in the ribbon plane, causing a measurable twisting in the fibres. The spacing of the fibres overall is compressed in the Nippon Telegraph document. In a further document, namely JP-A-09,197,145 (Tatsuta Electric Wire & Cable), the problem of degradation of signal is mentioned. However, the solution proposed is unclear but seems to reside in tightly bundling fibres from the ribbon array into a tight circular array, requiring again a sharp change of direction of the fibres from a single transverse plane in both directions towards the centre of the ribbon axis in one dimension, parallel with the transverse plane and also in a direction at right angles to the transverse ribbon plane.

According to the present invention, there is provided an optical fibre manifold arranged to spread optical fibres from a single dimensional ribbon array to a two dimensional block array, adjacent fibres in the ribbon array being spaced apart a first distance in a transverse direction characterised in that the same adjacent fibres remain the same first distance apart in the transverse direction when in the block array although being spread apart to at least a second distance.

The resultant change in geometric alignment of the optical fibres in the manifold of the invention is that there is a minimum of angular displacement which reduces the signal degradation.

A benefit of the invention is that each of the optical fibres of the ribbon array are only deflected in a single planar direction.

A further benefit is that a maximum dimension across the optical fibres in the block array is substantially the same as a dimension across the ribbon array parallel with said maximum dimension.

A benefit of the optical fibres being deflected only in the single planar, direction is that it enables the device to scale in size without limit to accommodate any size of ribbon fibre with no additional impact on the optical performance due to the effects of scale.

A further benefit is that the device need only scale in size in one direction in order to accommodate all ribbon fibres of a given construction. This simplifies the tooling required to manufacture a range of different sizes.

Preferably the block array is comprised of a block arranged so that each optical fibre may pass through the block and into a flexible tube.

Preferably an end of each of the flexible tubes is mounted to the block.

A benefit of this that small diameter optical fibres may be separated out and fed through flexible tubes having a larger external diameter, and hence providing protection and improved ease of handling for each of the optical fibres.

Preferably the block array comprises holes through which the optical fibres may pass, arranged in rows.

A benefit of this is that the number of rows may be varied in a particular embodiment to accommodate a particular difference between the spacing of the optical fibres and an external diameter of the tubes.

Preferably the manifold is symmetrical about an axial plane.

A benefit of this is that the number of different components that are required to be manufactured may be minimised.

Preferably the manifold is provided with a strain relief to ensure that the ribbon array is located securely to the manifold.

A benefit of the strain relief is that optical fibres within the manifold may remain in an unstressed condition.

Preferably the manifold is provided with bend radius control at ribbon fibre input to prevent damage to the fibres and the ribbon coating or sheath.

Preferably the manifold is provided with bend radius control at the fibre exit to prevent damage to the individual fibres principally through the action of band strain while under tension.

A benefit of bend radius control is that a risk of damage to the optical fibre is reduced.

Preferably the manifold is provided with a sleeve, through which the ribbon fibre passes prior to entering the body of the manifold. The sleeve is preferably made of a suitably sized flexible and compressible material.

A benefit of the sleeve is that it will provide padding and reduce the contact pressure due to irregularities between the fibres contained within the ribbon, the coating or sheathing material used to create the ribbon and the body of the manifold when the ribbon fibre is bent under tension by the manifold.

Preferably the sleeve is of sufficient length to cover the ribbon cable extending beyond the bond radius region.

A benefit of the sleeve extending along the ribbon cable is that the sleeve will effectively protect the fibres within the ribbon even if damage to the ribbon coating or sheath is incurred.

A further benefit is that the risk of damage to the ribbon construction is reduced and in the event of the ribbon construction failing the functionality of the device is maintained. A further benefit is that the operational life of the product is extended.

Preferably a support guide is provided within the manifold to closely support each optical fibre. More preferably the support guide is arranged to support each optical fibre such that the fibre follows a smoothly curving path through the manifold.

A benefit of this is that each of the optical fibres is routed through the manifold with no micro-bands that would cause damage to the optical fibres or reduce the transmission of light through the optical fibres.

A further benefit is that in use, any axial force on an optical fibre within a tube leaving the manifold is prevented from deflecting the fibre from the smoothly curving path. Hence, a risk of degradation of transmission of light in service may be avoided.

BRIEF DESCRIPTION OF THE DRAWINGS

In the drawings:

FIG. 7 is a perspective sectional view of the second manifold; and

FIG. 8 is a further sectional view along a longitudinal axis of the second manifold.

DETAILED DESCRIPTION OF THE INVENTION

Figure 1:
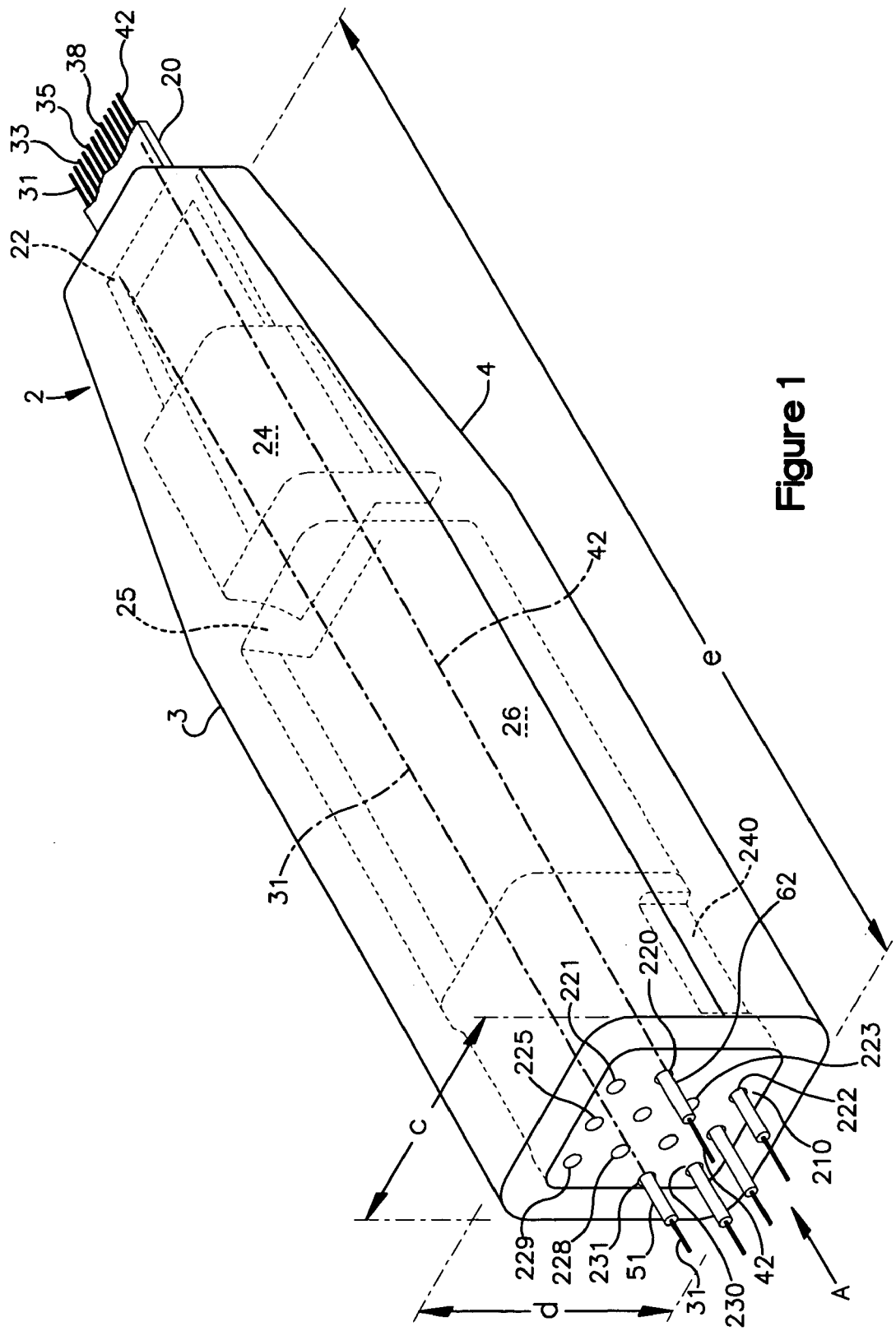
FIG. 1 is a perspective view of a first manifold according to the invention.

From FIG. 1, a perspective view of a manifold 1 can be seen to comprise a housing 2 formed from two identical mouldings 3 and 4, and a block 210. A ribbon cable 20 enters the housing at an entry opening 22, and passes through a strain relief block 24 through a support 25 and then enters a fanout chamber 26 where individual optical fibres 31 to 42 inclusive are separated from each other and led to their respective holes 231 to 220 respectively. The ribbon cable 20 comprises twelve optical fibres arranged in a linear array. Each optical fibre is protected by a plastics coating, and attached along an axial joint line on the circumference of each optical fibre. Inserted into each hole from a direction of arrow A are tubes 51 to 62 inclusive, each of which tubes receive an optical fibre 31 to 42 respectively. The tubes provide protection to the optical fibres as they are led away from the manifold. Each tube is 0.9 mm in diameter, but may be as small as 0.6 mm or less. Each tube has a bore with a diameter of 0.4 mm to allow clearance between the optical fibre which has an external diameter of 0.25 mm.

The strain relief block 24 comprises an elastomeric tubular sleeve that conforms closely to an external profile of the ribbon array, and is retained securely to the ribbon array. A suitable method of retention would be to use an adhesive or compression applied by a clip or the body of the manifold.

The elestomeric tubular sleeve is securely retained in a recess within the housing when the housing is closed around the ribbon array. Means (not shown) are provided to securely fasten each of the mouldings 3 and 4 to each other when assembled, examples of suitable such means being by a snap fit arrangement, screws, clips or adhesives. Each of the mouldings is provided with a location peg and socket to receive the peg of the other moulding. Hence alignment of the two mouldings is ensured.

Figure 2:
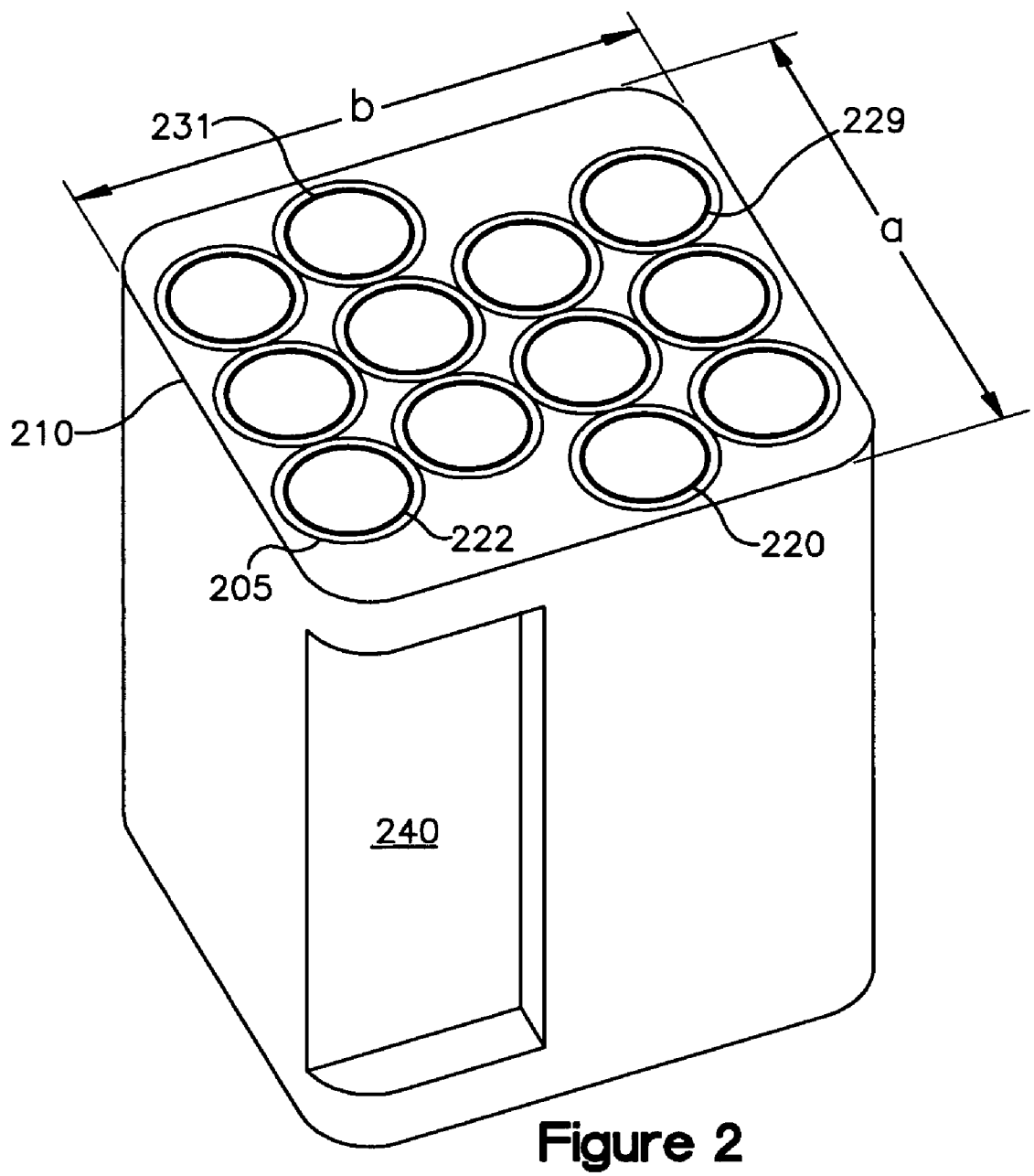
FIG. 2 is a perspective view of a block array of the manifold shown in FIG. 1.

FIG. 2 shows a perspective view of the block array 210. Recess 240 is provided to co-operate with a protrusion on an internal surface of the housing to locate the block array within the housing. Preferably the block is symmetrical about a longitudinal axis parallel to an axis of a hole for an optical fibre. More preferably the block is also symmetrical about an axis perpendicular to said longitudinal axis.

Figure 3:
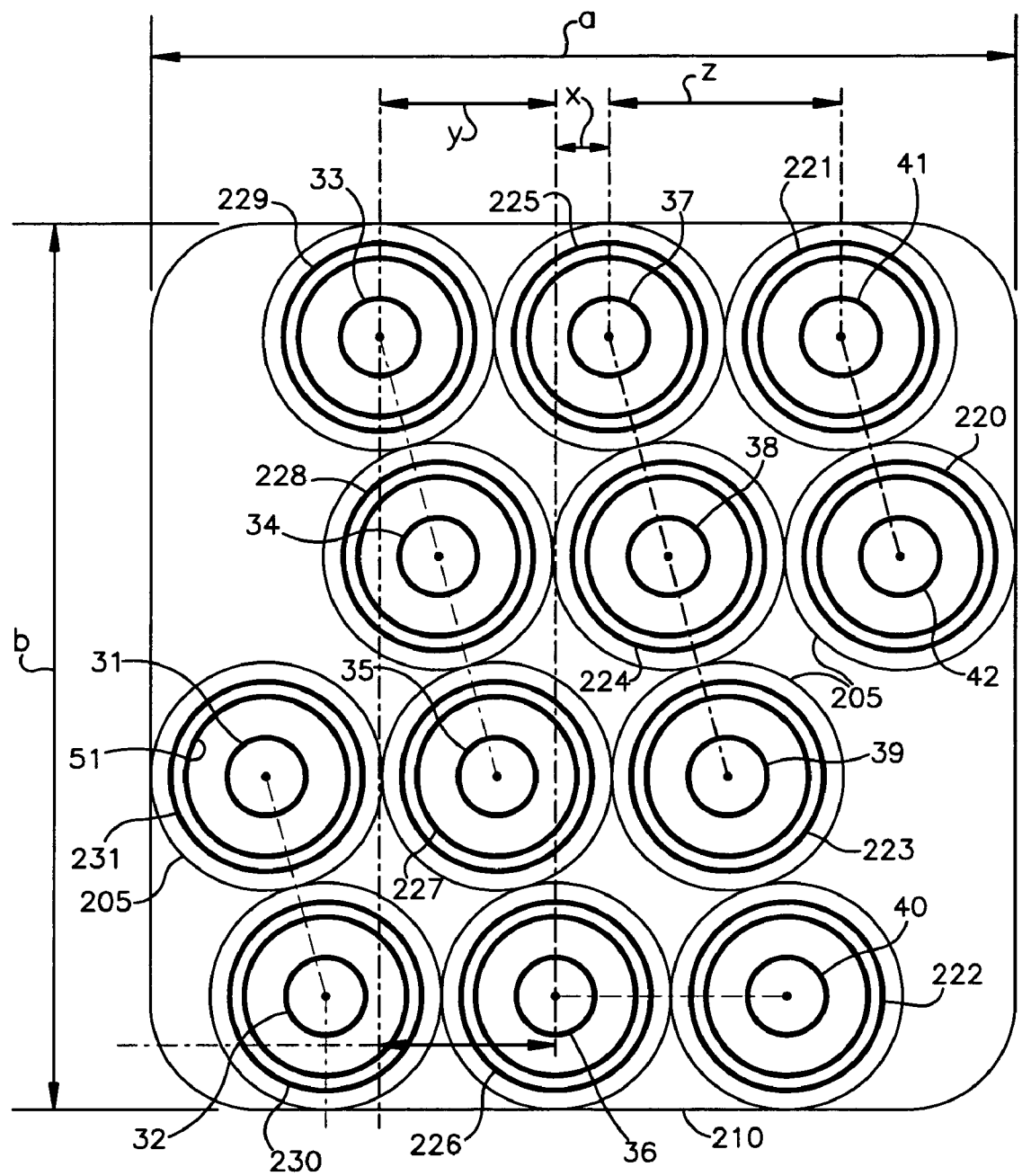
FIG. 3 is a diagrammatic end view of the block array shown in FIG. 2 showing the layout of holes to receive tubes.

From FIG. 3 an end view along arrow A of the block array 210 is shown with the layout of holes 231 to 220 to receive tubes 51 to 62 and optical fibres 31 to 42 respectively. Layout lines 205 are shown to illustrate the arrangement of the holes. Dimension x is equal to the pitch of the optical fibres in the one dimensional array of the ribbon cable, which in this embodiment is 0.25 mm, and dimension y is equal to three times the dimension x and hence dimension y is 0.75 mm and dimension z is equal to four times the dimension x, hence in this embodiment 1.0 mm. Block 210 has dimension a is 3.75 mm and dimension b is 3.90 nm and dimension c and d are each 6 mm and length of the housing is dimension a which is 25 mm.

The relationship between the dimensions x, y and z may be expressed as a general formula which would apply to other embodiments of the invention where because of a different ratio of tube diameter to pitch of the optical fibre ribbon array, a different number of rows of holes are required in the block array. Hence the general formula would be:—

$$z = nx = y + x$$

where:— n is the number of rows in the block array x is the pitch of the optical fibres in the ribbon army y is the dimension parallel to a transverse plane of the ribbon array between the centres of n holes z is the dimension parallel to a transverse plane of the ribbon array between the centres of adjacent holes in the same row.

The pitch of the optical fibres, shown as dimension x, is the spacing of the optical fibres in the one dimensional array of the ribbon cable, and is also the spacing of the optical fibres in the two dimensional array of the block array.

Figure 4:
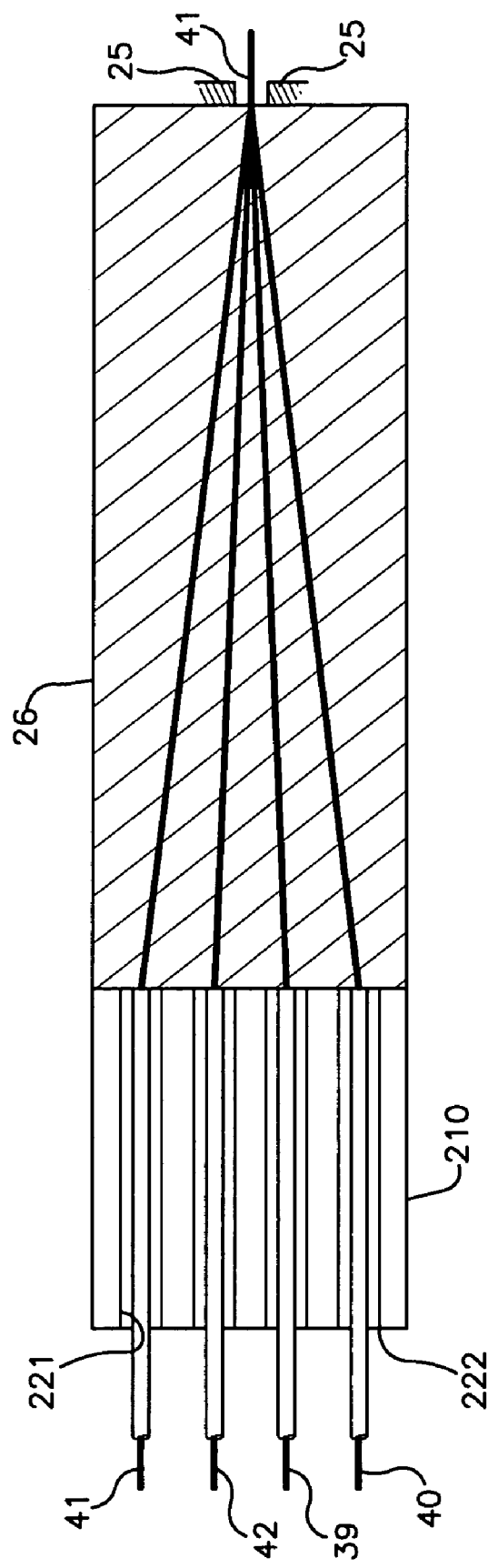
FIG. 4 is a longitudinal sectional view of part of the manifold of FIG. 1.

From FIG. 4 a section from a side of the manifold 1 showing four of the holes in the block array 210 in section. Support 26 has a radiused edge facing the chamber 26 to minimise a risk of damage to the optical fibres.

Figure 5:
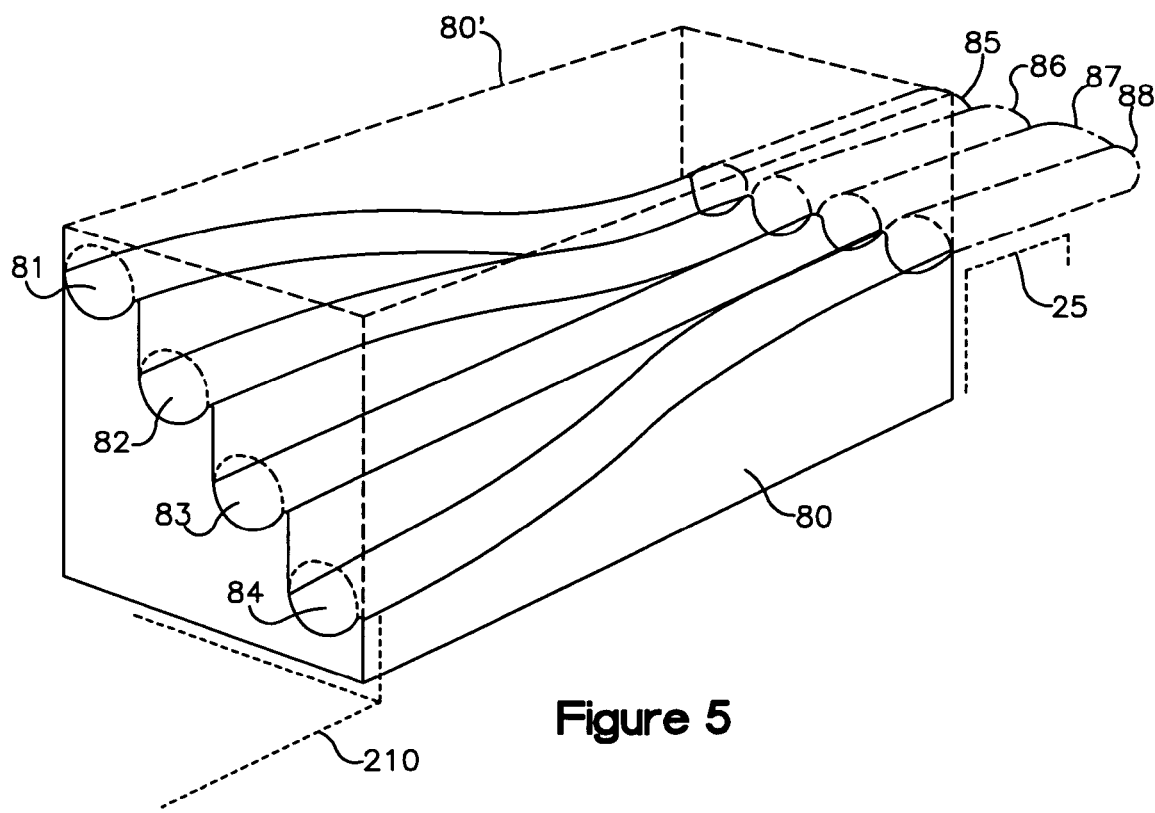
FIG. 5 is a perspective view of a support block for use with the manifold shown in FIG. 1.

FIG. 5 shows a diagrammatic view of a support block 80, having four support channels 81, 82, 83 and 84 to support four optical fibres 85, 86, 87 and 88 respectively between the support 25 and the block 210. In use two identical support blocks 80 and 80' (shown in dotted line) are used facing each other to ensure that each of the optical fibres is guided along an optimum path with optimum bond radii along the path. For manifold 1, where the optical fibre ribbon array cable comprises 12 optical fibres, three support blocks are required below the cable and three support blocks are required above the cable.

In an alternative embodiment similar to that of manifold 1, the support block is formed as part of the housing moulding.

Figure 6:
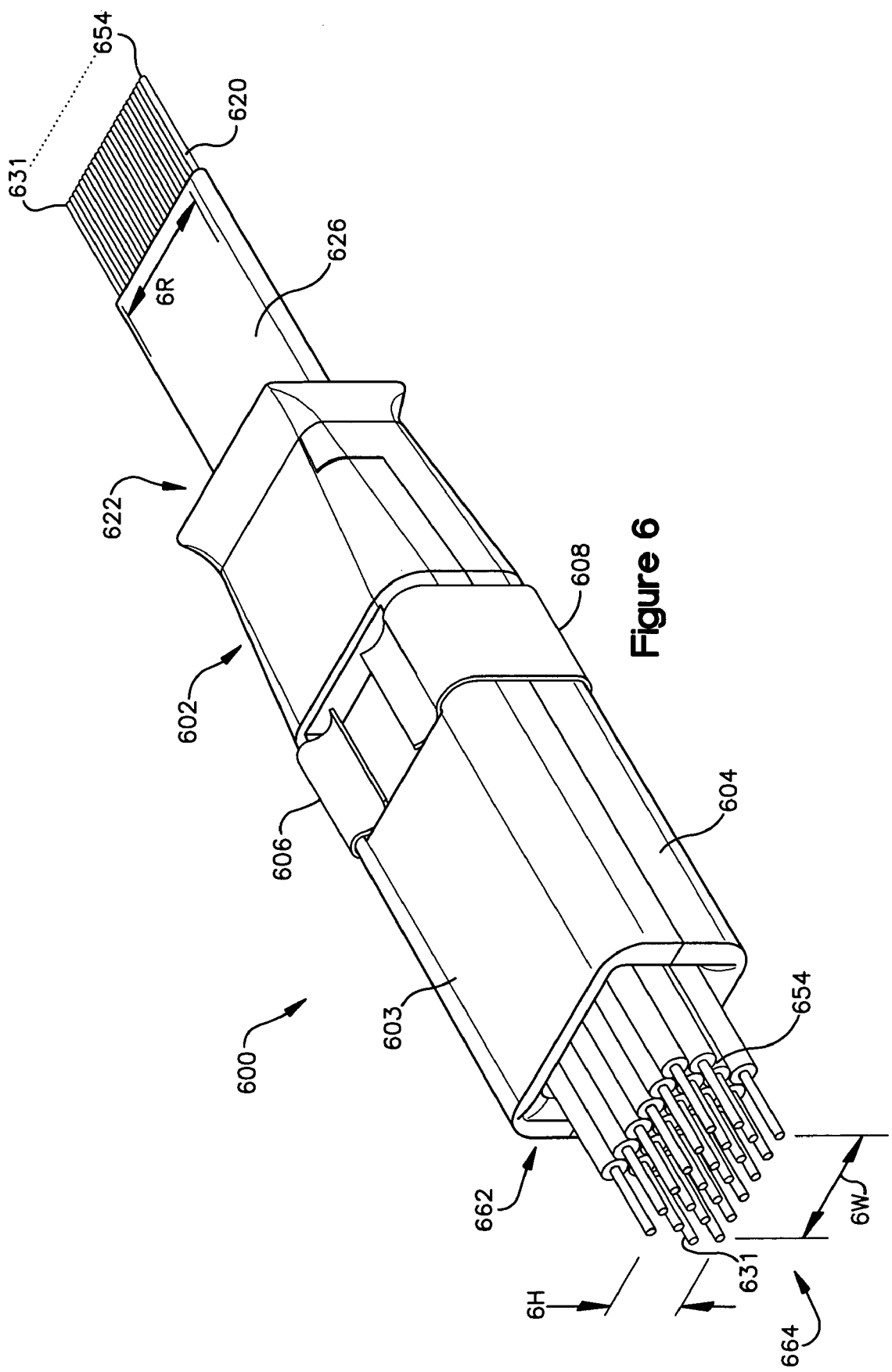
FIG. 6 is a perspective view of a second manifold according to the invention.

From FIG. 6 a perspective view of a second manifold 600 according to the invention. Manifold 600 comprises a housing 602 formed from two identical mouldings 603 and 604. The two mouldings are held together with a pair of identical clips 606 and 608 that locate in recesses 610 and 612. A ribbon cable 620 enters the housing at an entry opening 622, and passes through the manifold where individual optical fibres 631 to 654 inclusive are separated from each other leave the manifold at an exit opening 662. The ribbon cable comprises twenty-four optical fibres 631–654 arranged in a linear array at the entry to the manifold, the fibres being displaced in a single planar direction indicated by arrow 6P to spread the fibres to a two dimensional block array 664 at the exit from the manifold. The block array having a height 6H and a width 6W. The width 6W being the same as a width 6R of the ribbon cable.

FIGS. 7 and 8 are sectional views of the second manifold 600 and show strain relief means 614 for resisting an axial movement of the ribbon cable in the direction of arrow 6A, the strain relief means 614 being retained in recess 616 in the housings. The housings 603 and 604 are provided with an entry bend radius 624 at the entry opening 622. A dimension 6N of the entry bend radius is arranged to be sufficiently large so that when the ribbon cable is bent around the bend radius no damage will occur to the optical fibres 631 to 654, or to a ribbon coating or sheath 621. To further protect the ribbon cable an entry sleeve 626 is mounted over the ribbon cable 620. The entry sleeve preferably extends a length 6S along the ribbon cable such that support is provided to the ribbon cable should it be bent so as to contact edge 625 at an end of the entry bend radius 624.

The housings 603 and 604 are provided with an exit bend radius 684 at the exit opening 662. A dimension 8N of the exit bend radius is arranged to be sufficiently large so that when an optical fibre 631 to 654 is bent around the bend radius no damage will occur to the optical fibre. To further protect the optical fibres an exit sleeve 686 is mounted over each of the optical fibres 631 to 654. The exit sleeve preferably extends a length 6L along each of the optical fibres such that support is provided to each optical fibre should it be bent so as to contact edge 685 at an end of the exit bend radius 684. The exit sleeves are flexible tubes.

Mounted to the housings 603 and 604 is a block 690 having twenty-four parallel holes (only 691 labelled), each hole having a longitudinal axis parallel with a longitudinal axis 6X of the manifold. The holes are arranged so that the optical fibres are spread from the single dimensional array of the ribbon cable at the entry opening 622 to the two dimensional block array 664. Preferably the exit sleeves are retained to the block, for example by means of adhesive or another suitable method.

From FIG. 8, it can be seen that each optical fibre is displaced in a smooth curve at 8C within the manifold. Each optical fibre is only displaced in a single planar direction, the planar direction having a first axis parallel with the longitudinal axis 6X of the manifold 600. The planar direction has a second axis, perpendicular to the longitudinal axis, and in this embodiment, the second axis is in a direction shown by arrow 6Y and is parallel to an axis of the sectional view. In this embodiment the second axis is perpendicular to a transverse axis 6Z of the ribbon cable, the transverse axis passing through an axial centre-line of each of the optical fibres in the ribbon cable.

In an alternative embodiment, not shown in the Figures, the embodiment having a planar direction with a first and second axes similar to those described with reference to the embodiment 600, however in the alternative embodiment the second axis is at an angle other than 90 degrees to the transverse axis of the ribbon cable.

The invention claimed is:

1. An optical fibre manifold comprising, optical fibres that are spread from a single dimensional ribbon array to a two dimensional block array, adjacent fibres in the ribbon array being spaced apart a first distance in a substantially lateral direction and a second distance in a substantially longitudinal direction, wherein the same adjacent fibres remain the same first distance apart in the substantially lateral direction when in the block array in comparison to said first distance, further wherein the same adjacent fibres being space apart are spaced a greater distance in the substantially longitudinal direction when in the block array in comparison to said second distance, such that each of the optical fibres of the ribbon array are only deflected in a single planar direction.

2. An optical fibre manifold as claimed in claim 1 wherein the block array is comprised of a block arranged so that each optical fibre may pass through the block and into a flexible tube.

3. An optical fibre manifold as claimed in claim 2, wherein an end of each of the flexible tubes is mounted to the block.

4. An optical fibre manifold as claimed in claim 1, wherein the block array comprises holes through which the optical fibres may pass, said fibres arranged in rows.

5. An optical fibre manifold as claimed in claim 1, wherein the manifold is symmetrical about an axial plane.

6. An optical fibre manifold as claimed in claim 1, wherein the manifold is provided with a strain relief to ensure that the ribbon array is located securely to the manifold.

7. An optical fibre manifold as claimed in claim 1, wherein the manifold is provided with bend radius control at a ribbon fibre entry to prevent damage to the fibres and/or a ribbon coating or sheath.

8. An optical fibre manifold as claimed in claim 1, wherein the manifold is provided with a bend radius control at a fibre exit.

9. An optical fibre manifold as claimed in claim 1, wherein the manifold is provided with a sleeve, through which the ribbon fibre passes prior to entering the block array of the manifold.

10. An optical fibre manifold as claimed in claim 9, wherein the sleeve is made of a resiliently compressible material.

11. An optical fibre manifold as claimed in claim 10, wherein the sleeve extends along the ribbon cable beyond a bend radius region of a fibre exit bend radius control.

12. An optical fibre manifold as claimed in claim 1, wherein a support guide is provided to closely support each optical fibre.

13. An optical fibre manifold as claimed in claim 12, wherein the support guide is arranged to support each optical fibre such that the fibre follows a smoothly curving path through the manifold.

14. A system of optical fibres comprising, a manifold, wherein said manifold is arranged to spread said optical fibres from a single dimensional ribbon array to a two dimensional block array, wherein a first distance being a pitch distance in a transverse direction between centers of adjacent fibres in the ribbon array is no greater than the pitch distance between centers of the same adjacent fibres in said block array; further wherein a second distance substantially perpendicular to the pitch distance between centers of the same adjacent fibres in the block array is greater than the second distance between centers of the same adjacent fibres in said ribbon array, such that the width between the centers of the outermost fibers is no greater in the block array than in said ribbon array.

15. The system of optical fibres in claim 14, wherein each of the optical fibres of the ribbon array are only deflected in a single planar direction.

16. The system of optical fibres in claim 14, wherein the block array is comprised of a block arranged so that each optical fibre may pass through the block and into a flexible tube.

17. The system of optical fibres in claim 14, wherein said pitch distance between centers of adjacent fibres in the ribbon array is equal to the pitch distance between centers of the same adjacent fibres in said block array.

18. An optical fibre manifold comprising:
   a) a ribbon array of optical fibres arranged to engage said manifold, the array including a plurality of adjacent fibres defining a first distance equal to the distance between centers of any pair of said adjacent fibres in a lateral direction and defining a second distance between centers of any pair of said adjacent fibres in a longitudinal direction;
   b) said manifold arranged to spread said optical fibres from said ribbon array into a two dimensional block array;
   c) wherein said first distance between any pair of said adjacent fibres in the lateral direction in the ribbon array is no greater than the distance between centers of the same pair of adjacent fibres in a lateral direction in the two dimensional block array;
   d) further wherein, said second distance between any pair of said adjacent fibres in the longitudinal direction in the ribbon array is less than the distance between centers of the same pair of adjacent fibres in the longitudinal direction in the two dimensional block array;
   e) such that the width between the centers of the outermost fibers is no greater in the block array than in said ribbon array.

19. The optical fibre manifold of claim 18, wherein each of the optical fibres of the ribbon array are only deflected in a single planar direction.

20. The optical fibre manifold of claim 18, wherein the block array is comprised of a block arranged so that each optical fibre may pass through the block and into a flexible tube.

21. The optical fibre manifold of claim 18, wherein said first distance between any pair of said adjacent fibres in the lateral direction in the ribbon array is equal to a distance between centers of the same pair of adjacent fibres in a lateral direction in the two dimensional block array.

22. The optical fibre manifold of claim 18, wherein the bending of said optical fibres is minimized by a control curve placed within said manifold.

* * * * *